(12) United States Patent
Cen

(10) Patent No.: US 11,162,513 B2
(45) Date of Patent: Nov. 2, 2021

(54) ADJUSTABLE STAND FAN

(71) Applicant: ZHEJIANG JOYO ELECTRIC APPLIANCE TECHNOLOGY CO,. LTD., Ningbo (CN)

(72) Inventor: Wancheng Cen, Ningbo (CN)

(73) Assignee: ZHEJIANG JOYO ELECTRIC APPLIANCE TECHNOLOGY CO,. LTD., Ningbo (CN)

( * ) Notice: Subject to any disclaimer, the term of this patent is extended or adjusted under 35 U.S.C. 154(b) by 0 days.

(21) Appl. No.: 16/508,303

(22) Filed: Jul. 11, 2019

(65) Prior Publication Data
US 2020/0200190 A1   Jun. 25, 2020

(30) Foreign Application Priority Data

Dec. 20, 2018  (CN) .......................... 201811569539.3
Dec. 20, 2018  (CN) .......................... 201822144288.6

(51) Int. Cl.
| | |
|---|---|
| *F16M 11/12* | (2006.01) |
| *F04D 29/64* | (2006.01) |
| *F16M 11/18* | (2006.01) |
| *F16M 11/28* | (2006.01) |
| *F04D 25/08* | (2006.01) |

(52) U.S. Cl.
CPC ......... *F04D 29/646* (2013.01); *F16M 11/126* (2013.01); *F16M 11/18* (2013.01); *F16M 11/28* (2013.01); *F04D 25/08* (2013.01)

(58) Field of Classification Search
CPC .... F04D 29/646; F04D 29/601; F04D 29/626; F04D 29/705; F04D 25/08; F04D 25/0606; F16M 11/126; F16M 11/18; F16M 11/28; F16M 11/32; F24F 7/007; F24F 7/00
USPC ..................................... 248/661, 447.2, 156
See application file for complete search history.

(56) References Cited

U.S. PATENT DOCUMENTS

| | | | | |
|---|---|---|---|---|
| 1,028,097 | A * | 6/1912 | Colleen ..................... | B42D 9/00 40/357 |
| 4,917,343 | A * | 4/1990 | Wainscott .............. | A47B 23/06 248/284.1 |
| 5,403,162 | A * | 4/1995 | Chen ..................... | F04D 25/105 248/125.1 |
| 5,435,696 | A * | 7/1995 | Cunning ............... | F04D 25/105 416/100 |
| 5,458,462 | A * | 10/1995 | Shao ..................... | F04D 25/105 416/100 |
| 5,556,256 | A * | 9/1996 | Shao ..................... | F04D 25/105 403/141 |
| 5,558,501 | A * | 9/1996 | Wang .................... | F04D 25/088 248/159 |
| 5,720,594 | A * | 2/1998 | Snow .................... | F04D 25/105 416/100 |

(Continued)

*Primary Examiner* — Nkeisha Smith

(57) ABSTRACT

An adjustable stand fan includes a fan casing, a switch box, a lifting pipe, and a large chassis. The fan casing is fixed with an adjusting seat and is installed on the switch box through bolts. The switch box is mounted on a top of the lifting pipe that is vertically installed on a top of the large chassis. The lifting pipe includes a fixed end. External threads are on a bottom of the fixed end of the lifting pipe. A threaded hole matched with the fixed end of the lifting pipe is on a top center of the large chassis. A pitch angle adjusting mechanism is disposed in a joint between the adjusting seat and the switch box.

4 Claims, 8 Drawing Sheets

(56) References Cited

U.S. PATENT DOCUMENTS

| | | | | |
|---|---|---|---|---|
| RE36,514 E | * | 1/2000 | Clark | F04D 25/105 |
| | | | | 416/108 |
| 6,079,949 A | * | 6/2000 | Litvin | F04D 29/601 |
| | | | | 248/292.12 |
| 6,183,204 B1 | * | 2/2001 | Chang | F04D 29/601 |
| | | | | 416/244 R |
| 6,304,719 B1 | * | 10/2001 | Mo | F24C 7/065 |
| | | | | 248/161 |
| 6,364,618 B1 | * | 4/2002 | Moreno | F04D 29/703 |
| | | | | 403/13 |
| 6,533,548 B1 | * | 3/2003 | Wang | F04D 25/105 |
| | | | | 416/100 |
| 9,677,703 B2 | * | 6/2017 | He | F16M 11/26 |
| 9,848,585 B1 | * | 12/2017 | Perozo | A01K 5/00 |
| 10,094,396 B2 | * | 10/2018 | Song | F04D 29/705 |
| 2020/0056619 A1 | * | 2/2020 | Girard | F04D 29/601 |

\* cited by examiner

ADJUSTABLE STAND FAN

TECHNICAL FIELD

The present disclosure relates to a field of fan technology, and in particular to an adjustable stand fan.

BACKGROUND

The stand fan is featured by large airflow and low noise. It can ventilate, prevent heatstroke and improve environment in hot summer. Moreover, it is relatively safe when stand fan is put down on the ground steadily. The stand fan is widely used in warehouse, workshop, restaurant, household furniture and other places.

It is troublesome to adjust existing stand fan at present because fan bolts shall be loosened before adjusting the pitch angle of fan head, then, which will be tightened after adjusting to proper angle, in addition, lifting pipe of fan shall be assembled and disassembled with large chassis with special tools. As a result, it is bad for fan assembly, disassembly and transport. Given this, we hereby put forward a kind of adjustable stand fan.

SUMMARY

The present disclosure is to provide an adjustable stand fan in the hope of solving the foregoing problems mentioned above. In the prior art, fan bolts are loosened before adjusting the pitch angle of fan head, then, they are tightened after adjusting to proper angle. In addition, a lifting pipe of the fan shall be assembled and disassembled with a large chassis with special tools. As a result, it is not convenient for fan assembly, disassembly and transportation.

In order to solve the above-mentioned problems, the present disclosure provides the following technical scheme: An adjustable stand fan comprises a fan casing, a switch box, a lifting pipe and a large chassis. The fan casing is fixed with an adjusting seat and is installed on the switch box through bolts. The switch box is mounted on a top of the lifting pipe that is vertically installed on a top of the large chassis. The lifting pipe comprises a fixed end. External threads are on a bottom of the fixed end of the lifting pipe. A threaded hole matched with the fixed end of the lifting pipe is on a top center of the large chassis. A pitch angle adjusting mechanism is disposed in a joint between the adjusting seat and the switch box.

In one embodiment, the pitch angle adjusting mechanism comprises a pair of half gears installed on the adjusting seat and a pair of adjusting gears mounted on the switch box. The adjusting gears are engaged with the half gears. The half gears are disposed in clamping slots disposed on the adjusting seat.

In one embodiment, the optimized pitch angle adjusting mechanism comprises a pair of elastic adjustment sheets installed on the adjusting seat and a pair of adjusting gears mounted on the switch box; The adjusting gears are engaged with the elastic adjusting sheets disposed in the clamping slots on the adjusting seat and equipped with flat "V"-shaped structure on both ends. Moreover, the clamping slot has "T"-shaped longitudinal profile.

In one embodiment, the fan casing is made of front casing and rear casing. The front casing has multiple positioning bulges and at least one assembly block A The rear casing is externally equipped with multiple positioning grooves matched with the positioning bulges and at least one assembly block B matched with the at least one assembly block A; The positioning bulges are inlaid in positioning grooves for rotation.

Compared with the prior art, the present disclosure has the following advantageous effects:

1. With WIFI module, the present disclosure can control the fan online through a mobile terminal. The adjusting gears are installed on an axle of a driving motor in the switch box, so as to rotate the adjusting gears via the mobile terminal. In such case, half gears are also driven to or elastic adjusting sheet is stirred to rotate the fan casing. It is easy to adjust the pitch angle of the adjustable stand fan. In addition, the lifting pipe and the large chassis are tightened and loosened clockwise and anticlockwise respectively. Therefore, stable assembly and disassembly are facilitated.

2. With locking and unlocking module, the present disclosure can lock and unlock the adjustable stand fan at idle and using hours respectively, so as to avoid accidental activation. Therefore, it is convenient and safe to use this adjustable stand fan.

Figure 1:
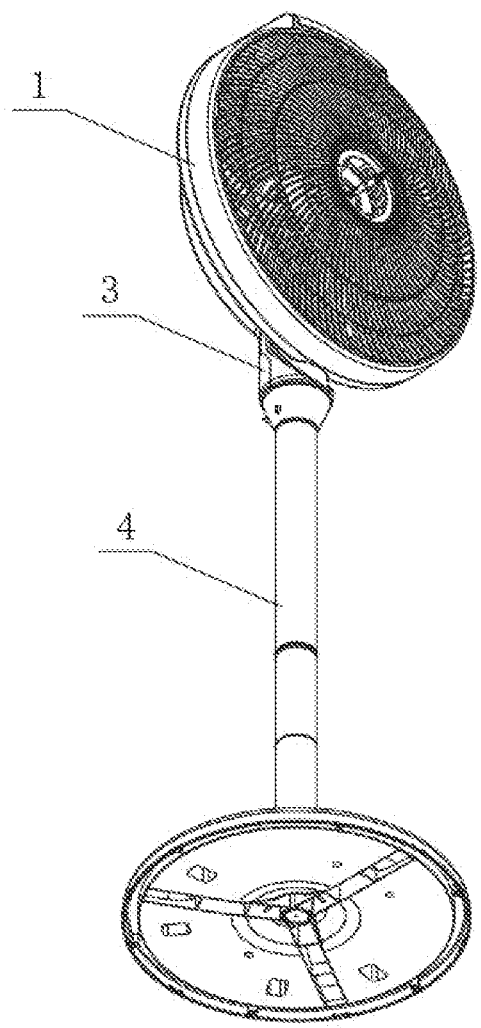
FIG. 1 is a schematic diagram showing a structure of an adjustable stand fan of the present disclosure.

In the drawings 1. Fan casing; 2. Adjustment seat 3. Switch box: 4. Lifting pipe; 5. Large chassis; 6. Threaded hole; 7. Fixed end; 8. Front casing; 9. Positioning bulge; 10. Assembly A; 11. Positioning groove; 12. Assembly B: 13. Rear casing; 14. Adjusting gear; 15. Half gears; 16. Clamping slot of half gears; 17. Elastic adjusting sheet; 18. Clamping slot of adjusting sheet.

DETAILED DESCRIPTION

In the following, clear and complete descriptions of the technological solution in the embodiments of the present disclosure will be provided in combination with attached Figures in the embodiment of the present disclosure; obviously, the described embodiments are only a part of the embodiments, not the whole ones. Based on the embodiment of the present disclosure, all other embodiments acquired by the ordinary skilled in the art without creative work, shall be in the protection scope of the present disclosure.

Embodiment 1

Figure 2:
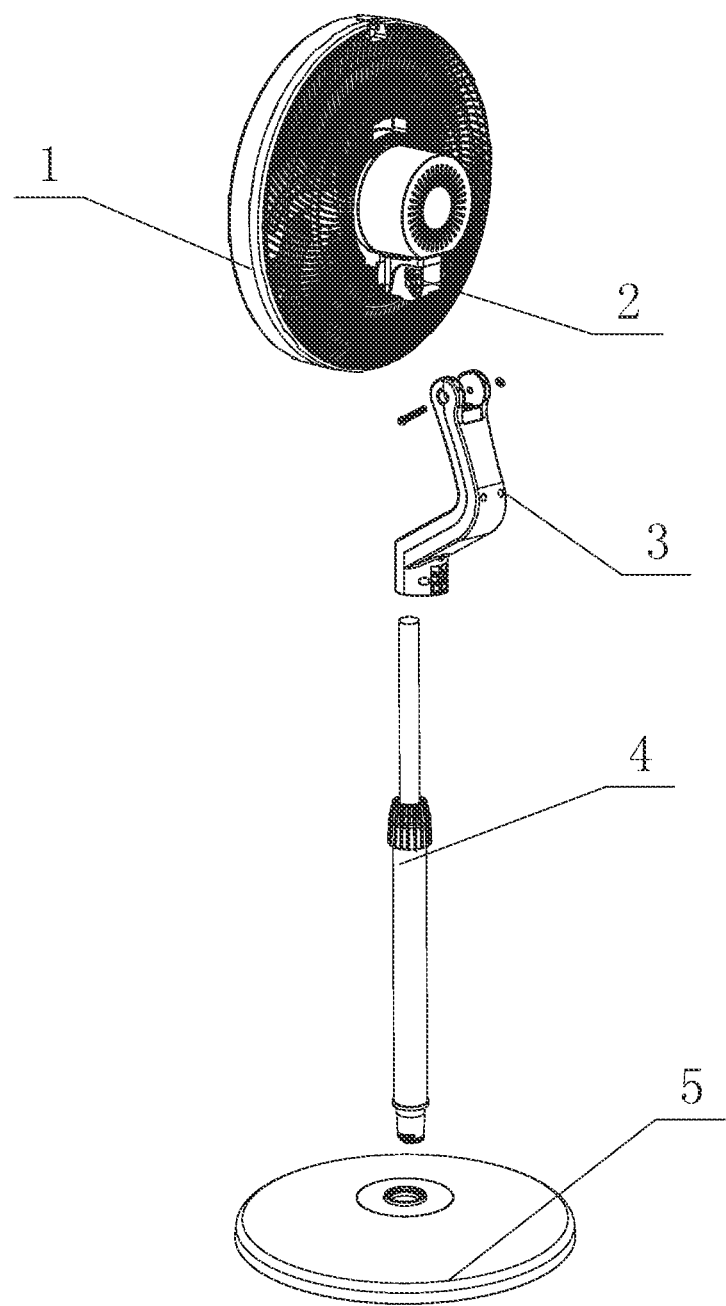
FIG. 2 is am exploded schematic diagram of the adjustable stand fan of the present disclosure.
Figure 3:
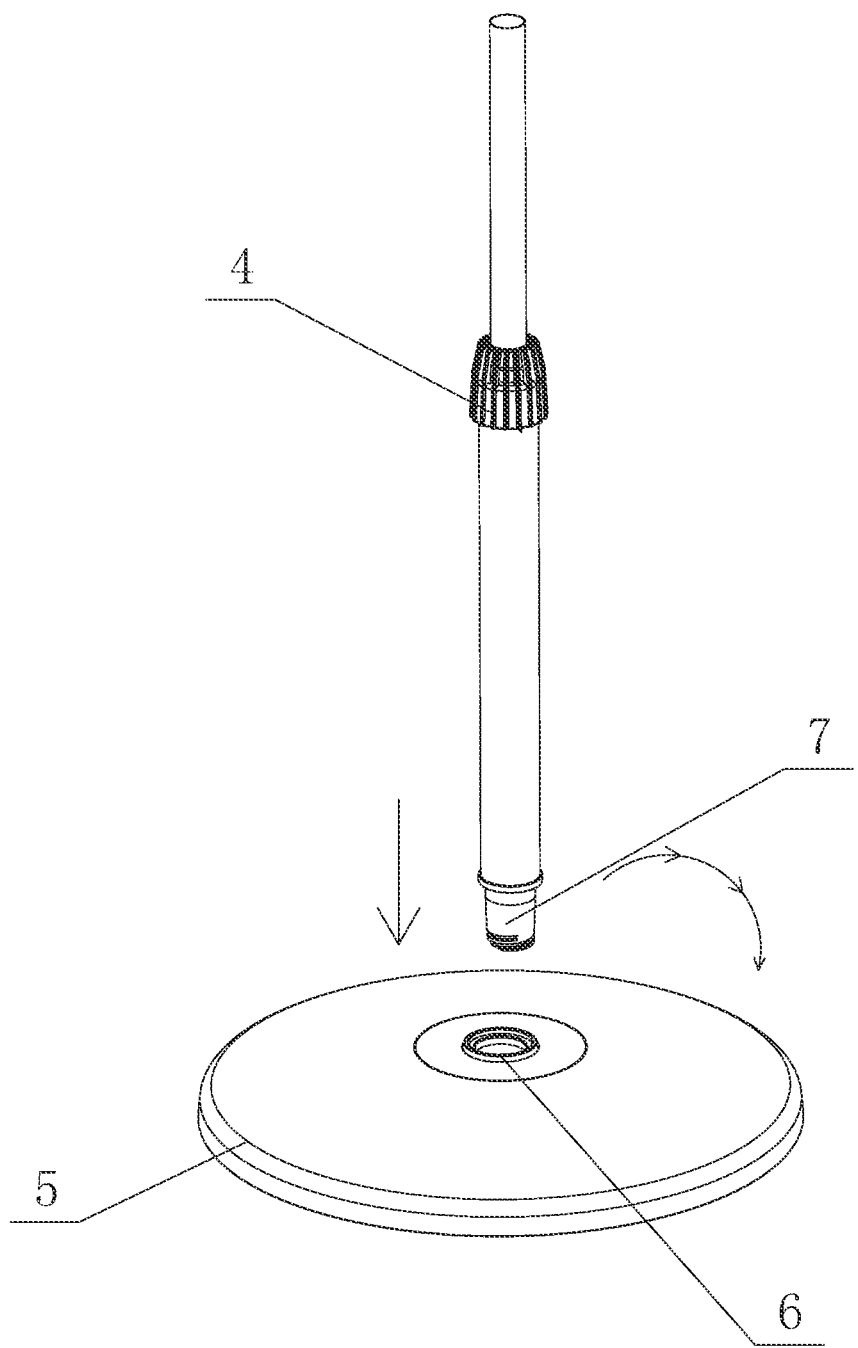
FIG. 3 is a schematic diagram showing a structure of a lifting pipe of the present disclosure.
Figure 4:
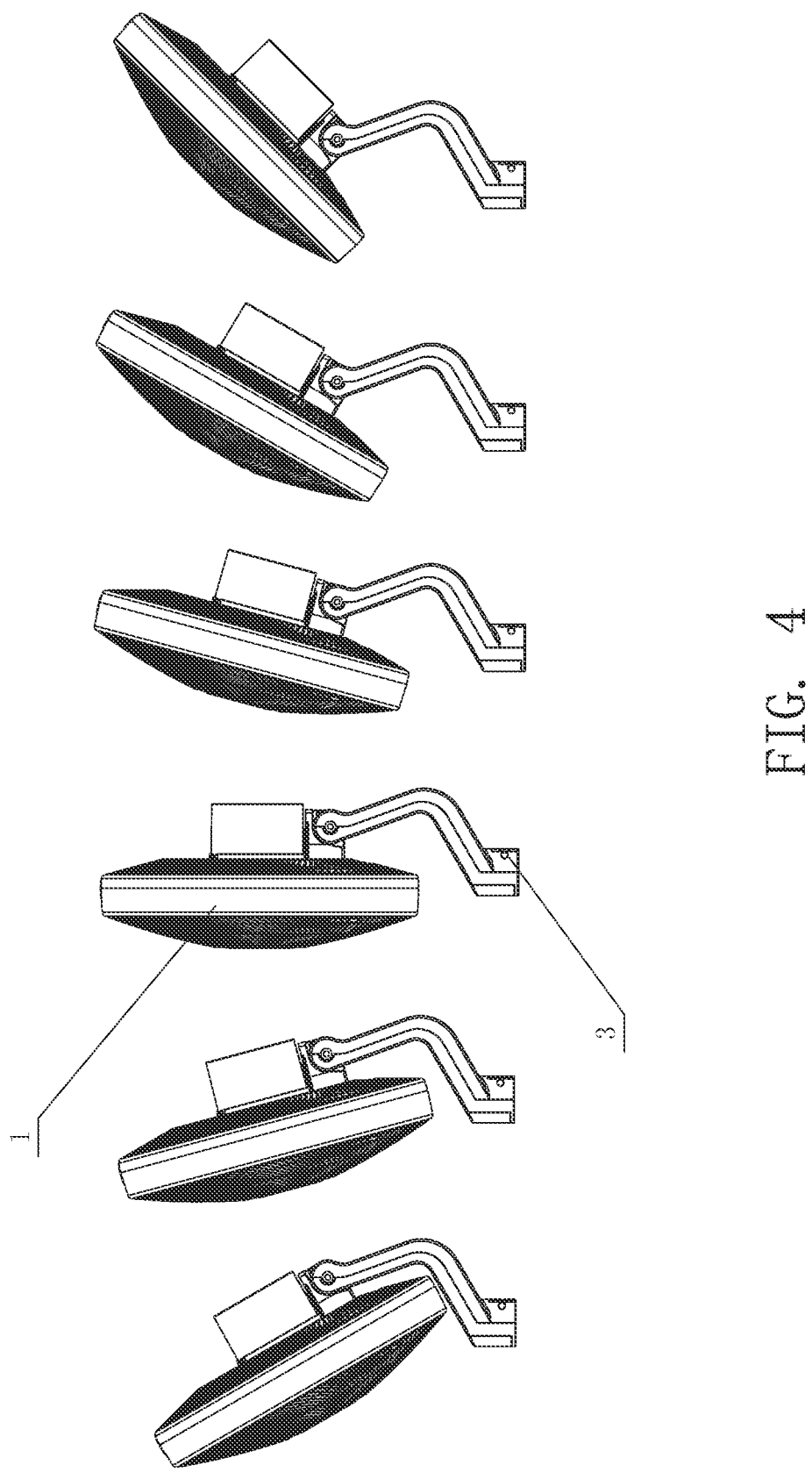
FIG. 4 is a schematic diagram showing a structure of a pitch angle adjusting mechanism of the present disclosure.
Figure 5:
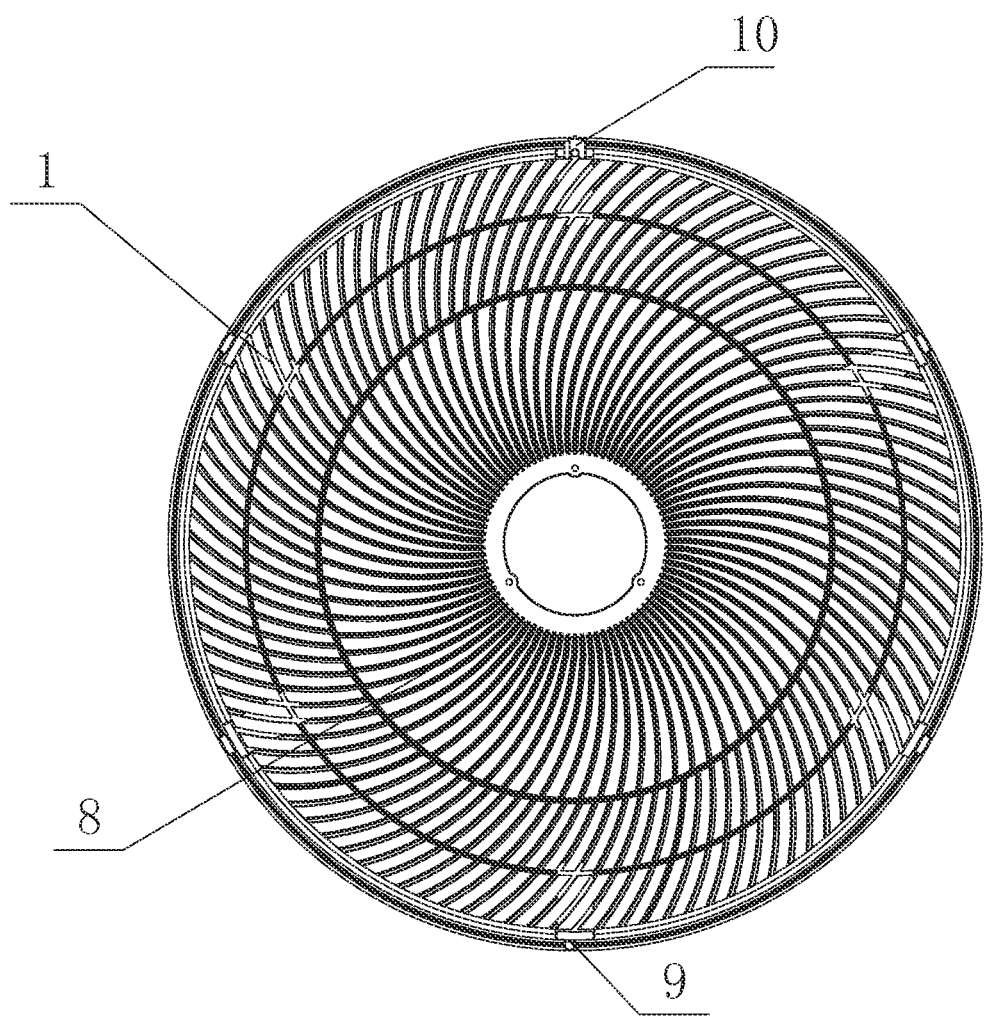
FIG. 5 is a front schematic diagram showing a structure of a front casing of the present disclosure.
Figure 6:
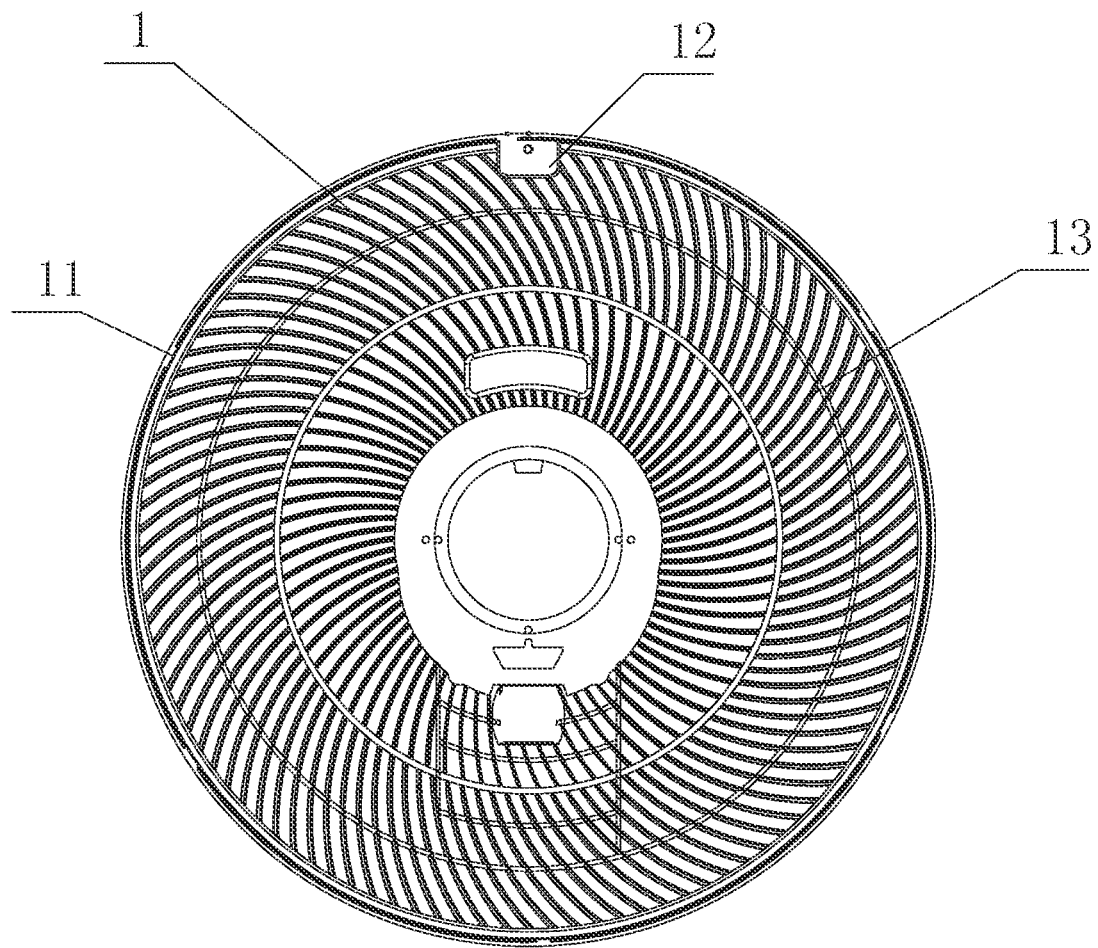
FIG. 6 is a font schematic diagram showing a structure of a rear casing of the present disclosure.
Figure 7:
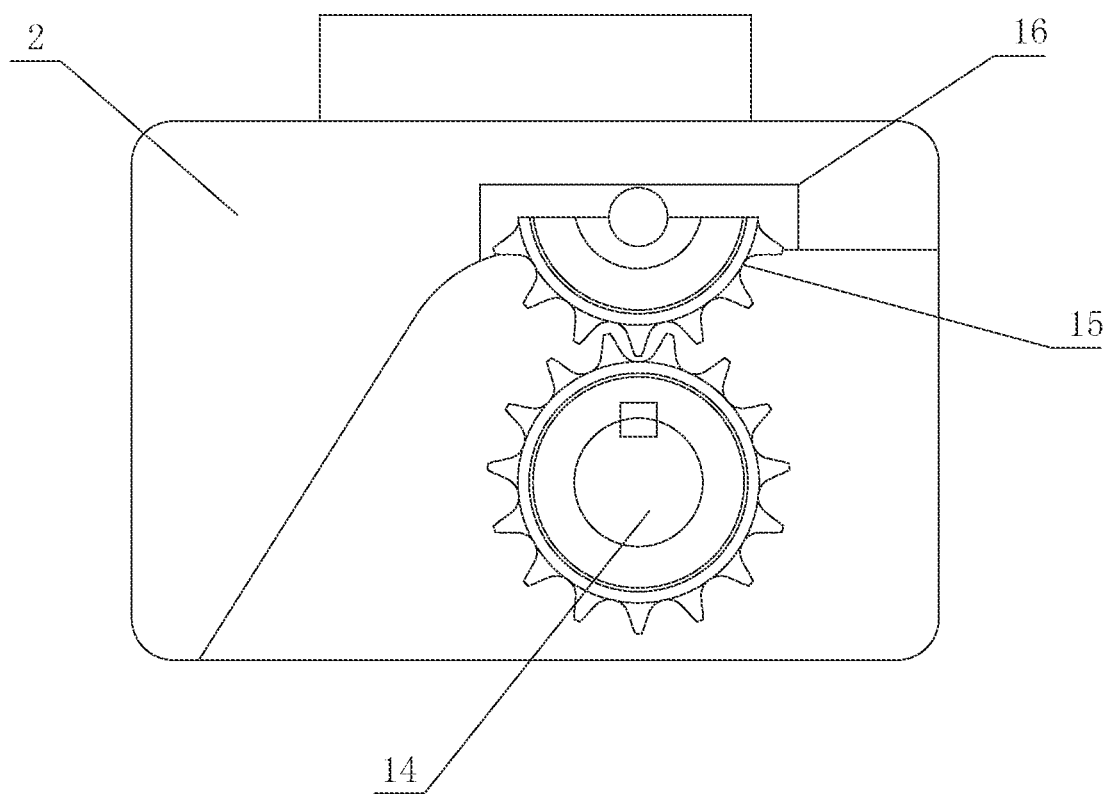
FIG. 7 is a side diagram showing a structure of a first pitch angle adjusting mechanism of the present disclosure.

Please refer to FIGS. 1-7, the present disclosure provides an adjustable stand fan including a fan casing 1, a switch box 3, a lifting pipe 4 and a large chassis 5 The fan casing 1 is fixed with the adjusting seat 2 through bolts. The fan casing 1 is installed on the switch box 3 through the adjusting seat 2. The switch box 3 is mounted on a top of the lifting pipe 4 through bolts. The lifting pipe 4 is vertically installed on a top of the large chassis 5 through threads. The lifting pipe 4 comprises a fixed end 7. External threads are on a bottom of the fixed end 7. A threaded hole 6 matched with the fixed end 7 is on a top center of the large chassis. A pitch angle adjusting mechanism is disposed in a joint between the adjusting seat 2 and the switch box 3.

To adjust a pitch angle of the fan casing 1 steadily, in one embodiment, the pitch angle adjusting mechanism comprises a pair of half gears 15 installed on the adjusting seat 2 and a pair of adjusting gears 14 mounted on the switch box 3 through the axle movement in this embodiment; The adjusting gears 14 are engaged with the half gears disposed in the clamping slots 16 on the adjusting seat 2. In addition, adjusting gears 14 are installed on an axle of a driving motor in the switch box 3.

To assemble and disassemble a front casing and a rear casing, in one embodiment, the fan casing 1 comprises a front casing 8 and a rear casing 13. The front casing 8 comprises multiple positioning bulges 9 and at least one assembly block A 10. The rear casing 13 is externally equipped with multiple positioning grooves 11 matched with the positioning bulges 9 and at least one assembly block B 12 matched with the assembly block A 10. The positioning bulges 9 are inlaid in the positioning grooves 11 for rotation.

Embodiment 2

Figure 8:
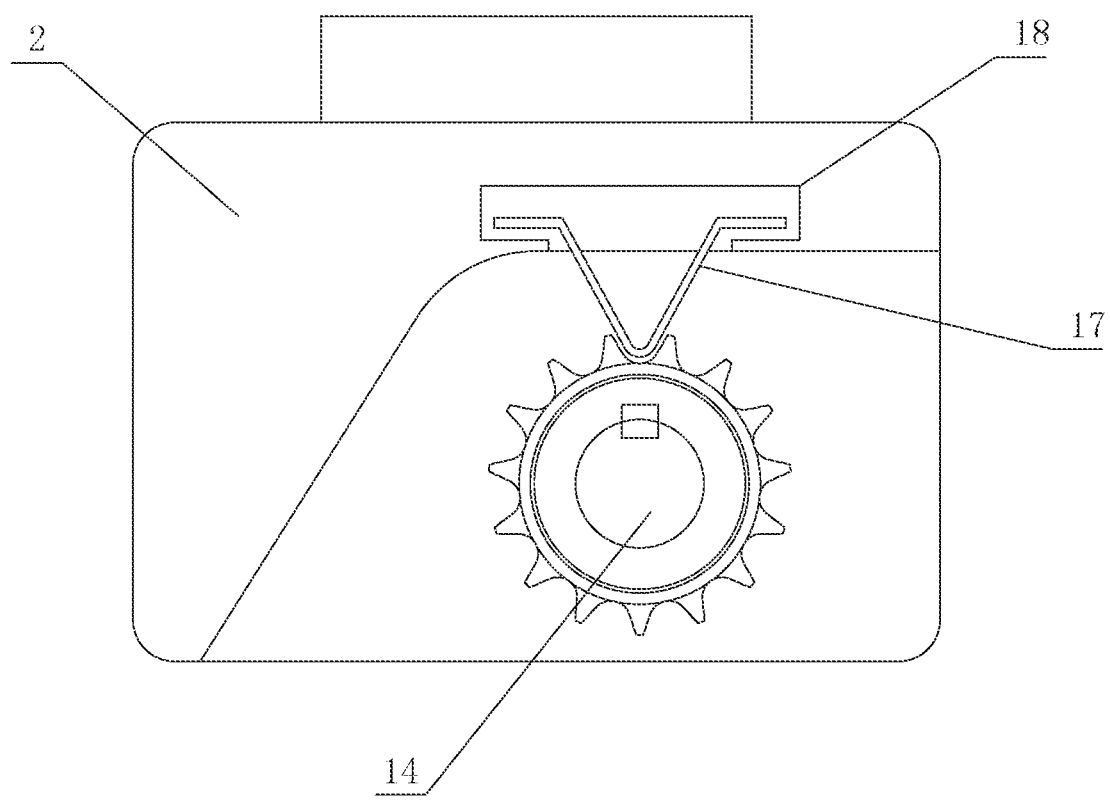
FIG. 8 is a side schematic diagram showing a structure of another pitch angle adjusting mechanism of the present disclosure.

Please refer to FIGS. 1-6 and 8, the present disclosure provides an adjustable stand fan, including a fan casing 1, a switch box 3, a lifting pipe 4 and a large chassis 5. The fan casing 1 is fixed with the adjusting seat 2 through bolts. The fan casing 1 is installed on the switch box 3 through the adjusting seat 2. The switch box 3 is mounted on a top of the lifting pipe 4 through bolts. The lifting pipe 4 is vertically installed on a top of the large chassis 5 through threads. The lifting pipe 4 comprises a fixed end 7. External threads are on a bottom of the fixed end 7. A threaded hole 6 matched with the fixed end 7 is on a top center of the large chassis. A pitch angle adjusting mechanism is disposed in a joint between the adjusting seat 2 and the switch box 3.

To adjust the pitch angle of the fan casing 1 steadily, in one embodiment, the pitch angle adjusting mechanism comprises a pair of elastic adjustment sheet 17 installed on the adjusting seat 2 through the axle movement and a pair of adjusting gears 14 mounted on the switch box 3. The adjusting gears 14 are engaged with elastic adjustment sheets 17 which are mounted in the clamping slots 18 on the adjusting seat 2 and equipped with flat "V"-shaped structure on both ends. Moreover, the clamping slots 18 has "T"-shaped longitudinal profile. The adjusting gears 14 are allowed to be installed on the axle of the driving motor in the switch box 3.

To assemble and disassemble a front casing and a rear casing, in one embodiment, the fan casing 1 comprises a front casing 8 and a rear casing 13. The front casing 8 comprises multiple positioning bulges 9 and at least one assembly block A 10. The rear casing 13 is externally equipped with multiple positioning grooves 11 matched with the positioning bulges 9 and at least one assembly block B 12 matched with the assembly block A 10. The positioning bulges 9 are inlaid in the positioning grooves 11 for rotation.

Operating principle and use flow of the present disclosure is as follows:

With WIFI module, the present disclosure can control the adjustable stand fan online through a mobile terminal. The adjusting gears 14 are installed on the axle of the driving motor in the switch box 3, so as to rotate the adjusting gears 14 via the mobile terminal. In such case, the half gears 15 are also driven to or the elastic adjusting sheets 17 are stirred to rotate the fan casing 1/It is easy to adjust the pitch angle of fan casing 1.

Step 1: Embed the adjusting seat 2 in the groove on the top of the switch box 3, make bolts pass through holes on the adjusting seat 2 and the switch box 3 for fastening. As a result, the fan body is formed.

Step 2: Embed the fixed end 7 in threaded hole 6, tighten it clockwise to form vertical column.

Step 3: Set fan body in vertical column of fan. As a result, the fan is formed. Although the embodiments of the present disclosure are shown and described, for those ordinary skilled in the art, they can make a variety of changes, modifications replacements and variants under the principle and spirit of the present disclosure, the scope of the present disclosure is limited by the attached claims and its equivalents.

What is claimed is:

1. An adjustable stand fan, comprising a fan casing, a switch box, a lifting pipe, and a large chassis;

wherein the fan casing is fixed with an adjusting seat; the fan casing is installed on the switch box through the adjusting seat; the switch box is mounted on a top of the lifting pipe; the lifting pipe is mounted on a top of the large chassis; a fixed end is disposed on a bottom of the lifting pipe; external threads are disposed on a bottom of the fixed end of the lifting pipe; a threaded hole is on a top center of the large chassis; the threaded hole is matched with the fixed end of the lifting pipe; a pitch angle adjusting mechanism is disposed in a joint between the adjusting seat and the switch box;

wherein the pitch angle adjusting mechanism comprises a pair of half gears installed on the adjusting seat and a pair of adjusting gears mounted on the switch box; the adjusting gears are engaged with the half gears; the half gears are disposed in clamping slots disposed on the adjusting seat.

2. The adjustable stand fan according to claim 1, wherein, the fan casing comprises a front casing and a rear casing; the front casing comprises multiple positioning bulges and at least one first assembly block; the rear casing comprises multiple positioning grooves matched with the positioning bulges and at least one second assembly block matched with the at least one first assembly block; the positioning bulges are inlaid in the positioning grooves for rotation.

3. An adjustable stand fan, comprising a fan casing, a switch box, a lifting pipe, and a large chassis;

wherein the fan casing is fixed with an adjusting seat; the fan casing is installed on the switch box through the adjusting seat; the switch box is mounted on a top of the lifting pipe; the lifting pipe is mounted on a top of the large chassis; a fixed end is disposed on a bottom of the lifting pipe; external threads are disposed on a bottom of the fixed end of the lifting pipe; a threaded hole is on a top center of the large chassis; the threaded hole is matched with the fixed end of the lifting pipe; a pitch angle adjusting mechanism is disposed in a joint between the adjusting seat and the switch box;

wherein the pitch angle adjusting mechanism comprises a pair of elastic adjusting sheets installed on the adjusting seat and a pair of adjusting gears mounted on the switch box; the adjusting gears are engaged with the elastic adjusting sheets; the elastic adjusting sheets are mounted in clamping slots disposed on the adjusting seat and are equipped with flat "V"-shaped structure on both ends of each of the elastic adjusting sheets.

4. The adjustable stand fan according to claim 3, wherein the fan casing comprises a front casing and a rear casing; the front casing comprises multiple positioning bulges and at least one first assembly block; the rear casing comprises multiple positioning grooves matched with the positioning bulges and at least one second assembly block matched with the at least one first assembly block; the positioning bulges are inlaid in the positioning grooves for rotation.

* * * * *